United States Patent
McCracken et al.

(10) Patent No.: US 6,381,681 B1
(45) Date of Patent: Apr. 30, 2002

(54) SYSTEM AND METHOD FOR SHARED MEMORY PROTECTION IN A MULTIPROCESSOR COMPUTER

(75) Inventors: David E. McCracken, San Francisco; Allan James Christie, Fremont; James A. Stuart Fiske, Palo Alto, all of CA (US)

(73) Assignee: Silicon Graphics, Inc., Mountianview, CA (US)

(*) Notice: Subject to any disclaimer, the term of this patent is extended or adjusted under 35 U.S.C. 154(b) by 0 days.

(21) Appl. No.: 09/410,120

(22) Filed: Sep. 30, 1999

(51) Int. Cl.[7] .............................................. G06F 12/00
(52) U.S. Cl. ....................................... 711/152; 711/153
(58) Field of Search ............................... 711/152, 163, 711/148, 153; 712/30

(56) References Cited

U.S. PATENT DOCUMENTS

| | | | |
|---|---|---|---|
| 4,564,900 A | * 1/1986 | Smitt | 364/200 |
| 5,394,555 A | * 2/1995 | Hunter et al. | 395/800 |
| 5,404,483 A | * 4/1995 | Stamm et al. | 395/425 |
| 5,511,178 A | * 4/1996 | Takeda et al. | 395/452 |
| 5,710,881 A | * 1/1998 | Gupta et al. | 395/200.3 |
| 5,815,651 A | * 9/1998 | Litt | 395/182.08 |
| 5,983,326 A | * 11/1999 | Hagersten et al. | 711/141 |
| 5,987,571 A | * 11/1999 | Shibata et al. | 711/141 |
| 6,226,718 B1 | * 5/2001 | Carpenter et al. | 711/152 |

OTHER PUBLICATIONS

Ekanadham et al., PRISM: An Integrated Architecture for Scalable Shared Memory, IEEE, pp 140–151, Feb. 4, 1998.*
Black et al., Competitive Management of Distributed Shared Memory, IEEE pp 184–190, 1989.*

* cited by examiner

*Primary Examiner*—Matthew Kim
*Assistant Examiner*—Stephen Elmore
(74) *Attorney, Agent, or Firm*—Baker Botts L.L.P.

(57) ABSTRACT

A memory protection system for shared memory in a multiprocessor computer is provided that comprises a multiprocessor computer (10) having a plurality of processor regions and a plurality of memory pages (16). Each processor region includes one or more processors (12). Each processor (12) includes a cache (18), and each memory page (16) includes one or more cache lines (20) for coupling to the cache (18) of processors (12) within the plurality of processor regions using the memory page (16). Each memory page (16) includes a set of protection bits (82) associated with each processor region in the plurality of processor regions. The set of protection bits (82) includes an acquire protection bit (84) for each processor region in the plurality of processor regions. The acquire protection bit (84) determines whether the associated processor is enabled to perform acquire operations on the memory page (16). The set of protection bits (82) also includes a release protection bit (86) for each processor region in the plurality of processor regions. The release protection (86) determines whether the associated processor is enabled to perform release operations on the memory page (16).

17 Claims, 7 Drawing Sheets

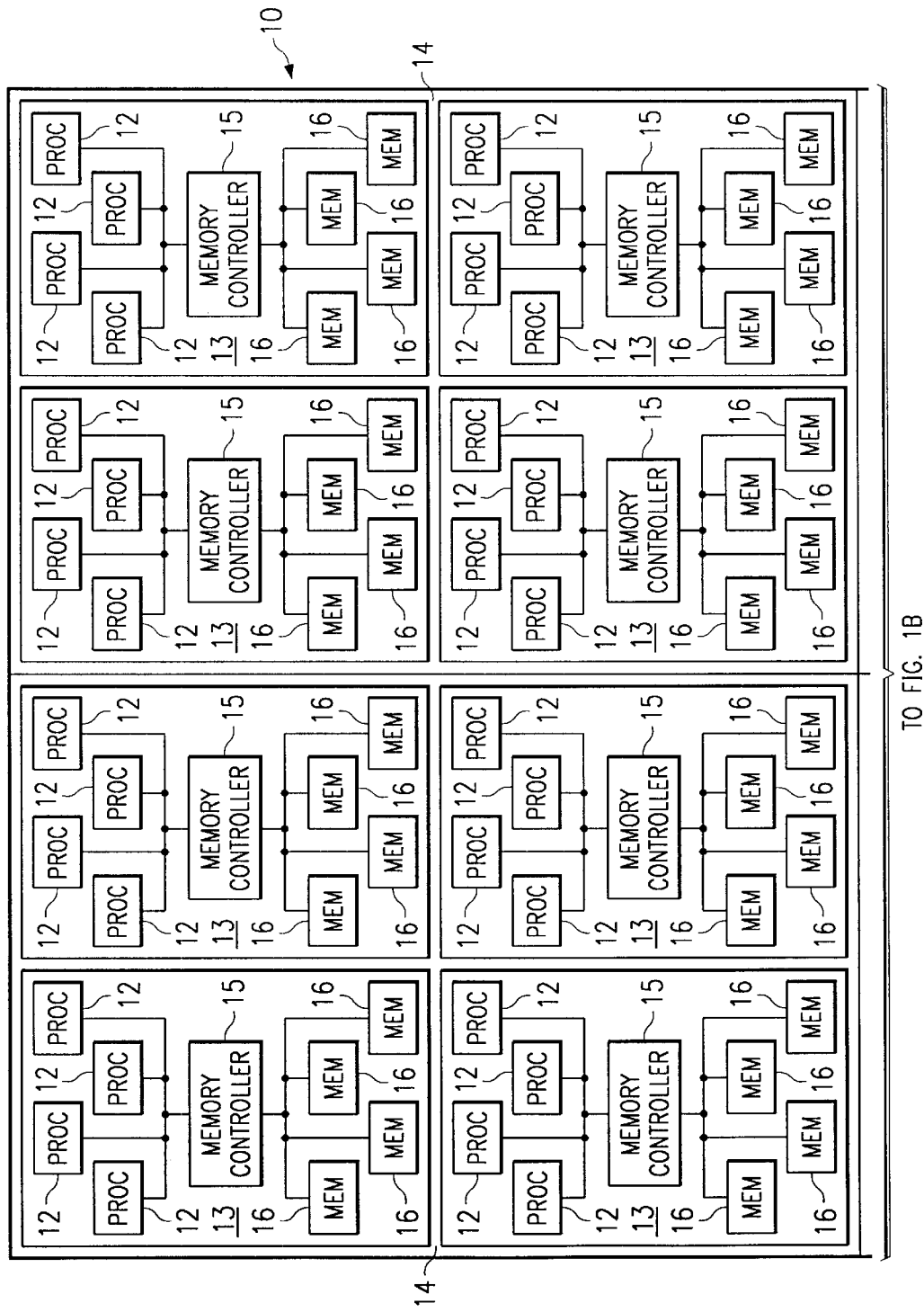

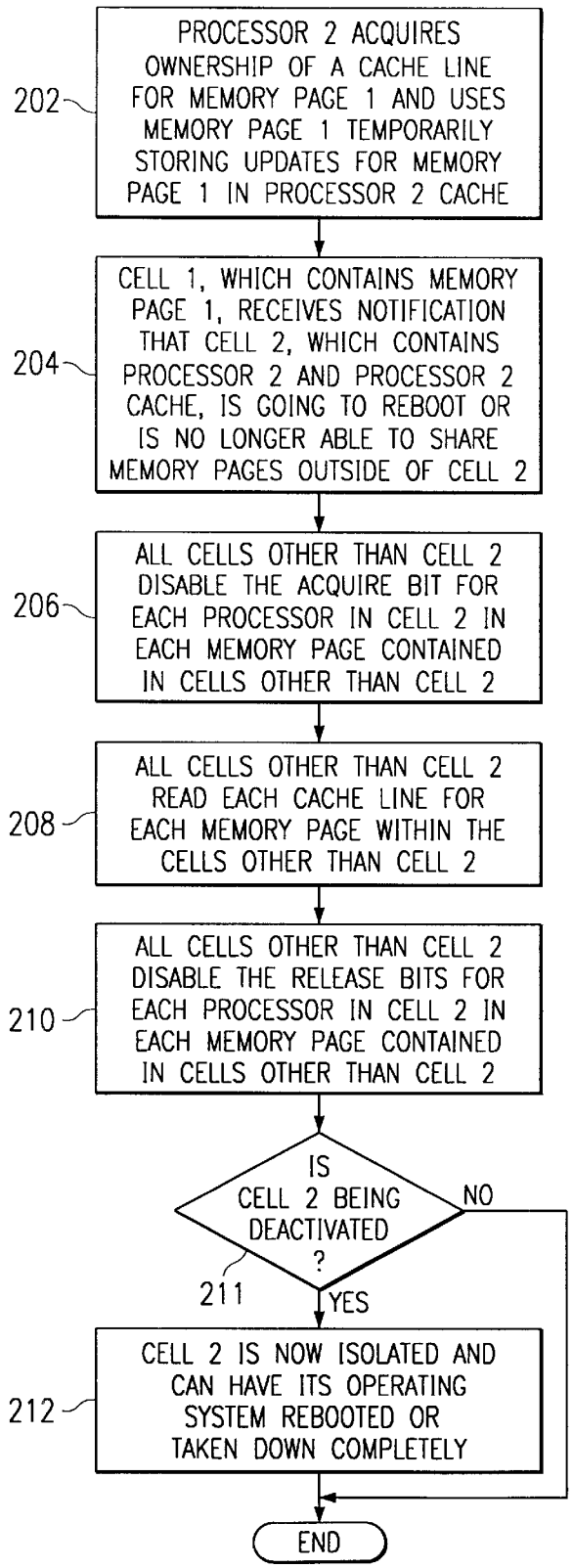

SYSTEM AND METHOD FOR SHARED MEMORY PROTECTION IN A MULTIPROCESSOR COMPUTER

TECHNICAL FIELD OF THE INVENTION

This invention relates in general to the field of computer memory systems, and more particularly to a system and method for shared memory protection in a multiprocessor computer.

BACKGROUND OF THE INVENTION

Multiprocessor computers often include a large number of computer processors that may operate in parallel. One example of parallel processing computer architectures is Cache-Coherent multiprocessors with Non-Uniform Memory Access (NUMA) architecture. Non-Uniform Memory Access (NUMA) architecture is a type of parallel processing architecture in which each processor has its own local memory that can also act as memory for other processors. The parallel processing architecture is referred to as Non-Uniform because memory access times are faster when a processor accesses its own local memory as compared to when a processor borrows memory from another processor.

As the number of parallel processors in a multiprocessor computer increases, the ability to run certain software in parallel across all of the processors diminishes. For example, although scientific software scales well up to a large number of processors, other software such as operating systems run best on a smaller number of processors. Therefore, the processors in a multiprocessor computer are often segmented into cells of processors. Each cell may run separate software such as operating systems. By segmenting processors into cells, one cell may be taken down to perform routine maintenance, to replace boards, to reboot operating systems, or to perform any other task without affecting other cells in the multiprocessor computer. The use of cells gives better reliability since one cell can go down while other cells remain active.

In order to maintain cache coherence and protect memory pages from unauthorized access, a protection scheme is generally used to enable or disable shared access to a memory page in multiprocessor computers. A memory page may consist of memory data and a memory directory that tracks the state of cache lines coupled to the memory page. Conventional memory protection schemes utilize memory protection codes in each memory page with one bit for each processor. The protection code indicates whether a particular processor can access the memory page. As soon as the memory protection bit for a particular processor is disabled, that processor can no longer access the memory page and cannot apply any updates that may be waiting in cache to be applied to the memory page. Therefore the memory page may not have the most current data. Conventional systems have handled this problem by not allowing a cell of processors to be taken down independent of other cells of processors in a multiprocessor computer. Another conventional technique involves complex software to handle problems associated with a memory protection scheme using a single bit to indicate whether a particular processor may access the memory page. Therefore, it is desirable to provide an enhanced shared memory page protection scheme in a multiprocessor computer.

SUMMARY OF THE INVENTION

From the foregoing, it may be appreciated that a need has arisen for a system and method for shared memory protection in a multiprocessor computer that provides enhanced shared memory protection. In accordance with the present invention, a system and method for shared memory protection in a multiprocessor computer are provided that substantially eliminate and reduce disadvantages and problems associated with conventional shared memory protection schemes.

According to an embodiment of the present invention, a memory protection system for memory shared between multiple processors is provided that includes a multiprocessor computer having a plurality of processor regions and a plurality of memory pages. Each processor region includes one or more processors. Each processor includes a cache, and each memory page includes one or more cache lines for association with the cache of processors within the plurality of processor regions using the memory page. Each memory page includes a set of protection bits associated with each processor region in the plurality of processor regions. The set of protection bits includes an acquire protection bit for each processor region in the plurality of processor regions. The acquire protection bit determining whether the associated processor region is enabled to perform acquire operations on the memory page. The set of protection bits also includes a release protection bit for each processor region in the plurality of processor regions. The release protection bit determining whether the associated processor region is enabled to perform release operations on the memory page.

The present invention provides various technical advantages over conventional shared memory protection schemes. For example, one technical advantage is that separate acquire protection and release protection bits are used for each of several processor regions within the multiprocessor computer. The separate protection bits allow a cell of processors to assure that memory pages are current before terminating all access to the memory pages for a particular processor. Another technical advantage is that memory updates from processors within a cell common to the shared memory page being updated occur immediately without verifying memory protection information. This eliminates the processing overhead associated with memory protection verification when the processor updating the memory page is considered local with respect to that memory page. Other technical advantages may be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, in which like reference numbers represent like parts, and in which:

FIG. 6 is a flow diagram illustrating deactivation of a cell of processors within the multiprocessor computer.

DETAILED DESCRIPTION OF THE INVENTION

Figure 1B:
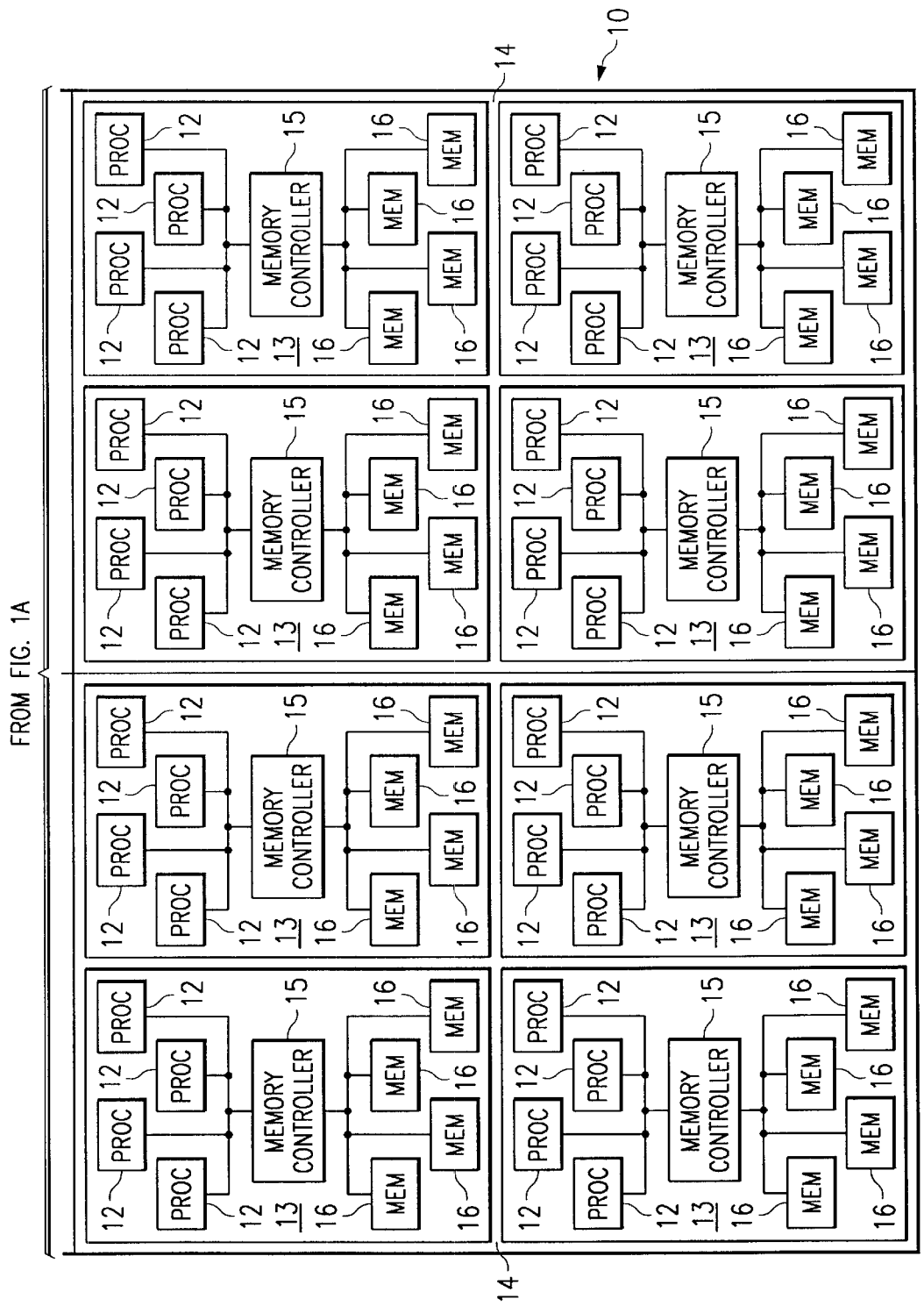
FIG. 1 illustrates a multiprocessor computer that includes a plurality of processors segmented into several cells.

Referring to FIG. 1, a multiprocessor computer is generally indicated at 10. Multiprocessor computer 10 includes a plurality of processors 12 and a plurality of memory pages 16. The plurality of processors 12 and plurality of memory pages 14 may be subdivided into a set of clusters 13 where each cluster 13 includes a subgroup of the plurality of processors 12 and a subgroup of the plurality of memory pages 16. Each cluster 13 includes a memory controller 15 to control the subgroup of memory pages 16 associated with that particular cluster 13. The set of clusters 13 may be grouped into groups of one or more clusters to form one or more cells 14. In one embodiment, multiprocessor computer 10 includes sixty-four processors 12 segmented into four cells 14 each consisting of sixteen processors 12. Each cell 14 includes four clusters 13 with each cluster 13 consisting of four processors 12. Although the present invention will be discussed in terms of the embodiment illustrated in FIG. 1, multiprocessor computer 10 may include any suitable number of processors and any suitable number of cells 14.

Figure 2:
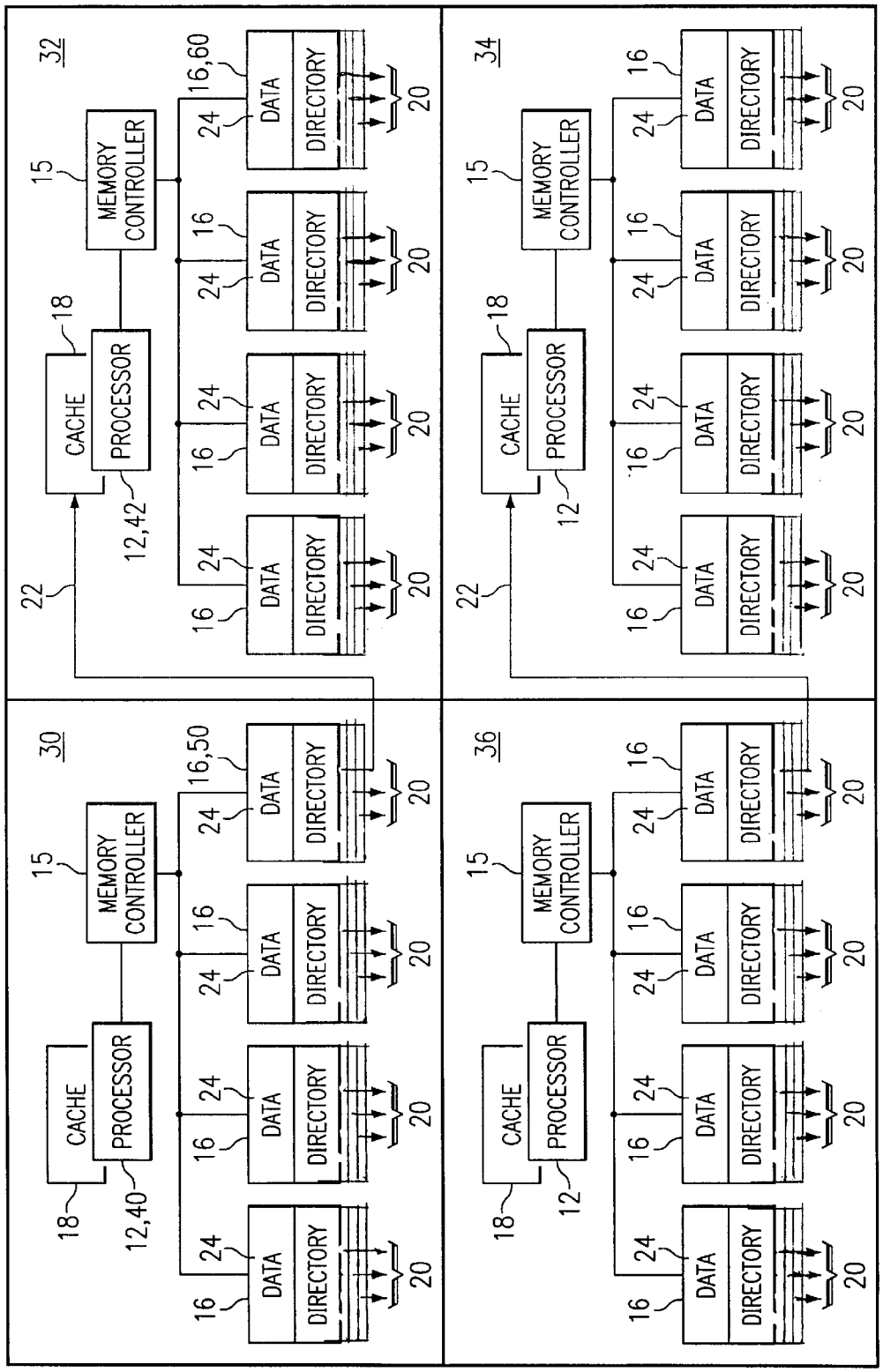
FIG. 2 illustrates a first processor with an associated cache in a first cell and a second processor with an associated cache in a second cell.

Referring to FIG. 2, multiprocessor computer 10 is illustrated showing additional details of a representative processor 12 within each cell 14. Other processors 12 within each cell 14 are not shown for ease of illustration. However, each cell 14 may include any suitable number of processors 12 and clusters 13. Each representative processor 12 includes an associated cache 18 and is coupled to a memory controller 15 through which it acquires access to memory pages 16. Each memory page 16 has a set of cache lines 20 available for acquisition by other processors 12 so that other processors 12 may share memory pages 16. Each memory page 16 includes a memory data 24 and a memory directory 26. Memory directory 26 tracks information related to memory page 16 such as the current state of each cache line 20, what processors are associated with cache lines 20, and other memory information.

The four cells 14 in the embodiment illustrated in FIG. 1 and FIG. 2 may be referred to as a first cell 30, a second cell 32, a third cell 34, and a fourth cell 36. Although each cell 14 illustrates a representative processor 12, each cell 14 includes a plurality of processors 12 segmented into one or more clusters 13. The processor 12 in first cell 30 may be referred to as a first processor 40. The processor 12 in second cell 32 may be referred to as a second processor 42. One of the memory pages in first cell 30 may be referred to as a first cell memory page 50, and one of the memory pages 16 in second cell 32 may be referred to as a second cell memory page 60. The cache 18 associated with first processor 40 may be referred to as a first cache 52, and the cache 18 associated with second processor 42 may be referred to as a second cache 62.

Processors 12 in multiprocessor computer 10 may use any memory page 16 within multiprocessor computer 10. A processor 12 accesses another memory page 16 by acquiring ownership of a cache line 20 and establishing a cache line connection 22.

In certain situations in multiprocessor computer 10, certain memory pages 16 may not be available for shared access between the plurality of processors 12. In other situations, certain memory pages 16 may only be accessible to certain processors 12. In addition, cells 14 may need to be taken down or rebooted without affecting the operation of other cells 14 within multiprocessor computer 10. Therefore, a memory protection scheme is needed that provides for orderly removal of memory pages 16 from the shared area of multiprocessor computer 10. In addition, the overhead associated with memory protection schemes should be minimized to enhance performance of multiprocessor computer 10.

Figure 3:
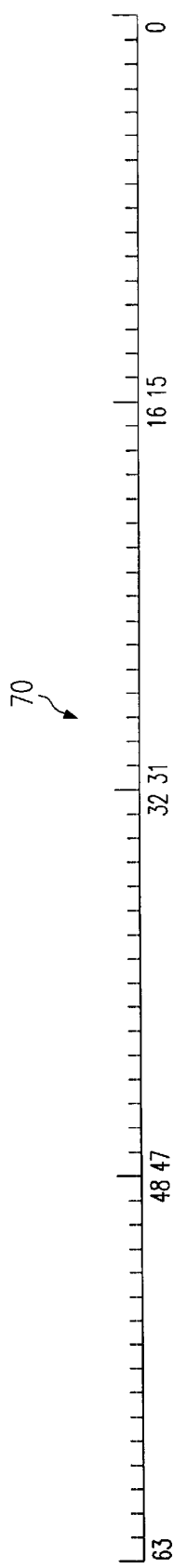
FIG. 3 illustrates a current cell register.

Referring to FIG. 3, a current cell register is generally indicated at 70. Current cell register 70 has a bit for each processor 12 or processor region within multiprocessor computer 10. If multiprocessor computer 10 includes more processors 12 than bits in current cell register 70, each bit in current cell register 70 represents multiple processors 12 grouped into processor regions such that all processors 12 in multiprocessor computer 10 are represented in current cell register 70. In one embodiment, current cell register 70 includes 64 bits numbered 0 through 63, right to left. In the embodiment of the current invention illustrated in FIG. 1, each processor 12 has an associated bit in current cell register 70.

Current cell register 70 is located in memory controller 15. Thus, each memory controller 15 includes a current cell register 70. The "on" bits in current cell register 70 indicate which processors 12 in multiprocessor computer 10 are within the cell 14 including the memory controller 15. Current cell register 70 is used to determine whether local protection is used for a memory page 16 controlled by the memory controller 15 or whether enhanced shared memory protection is used for a particular memory page 16 controlled by memory controller 15.

Figure 4A:
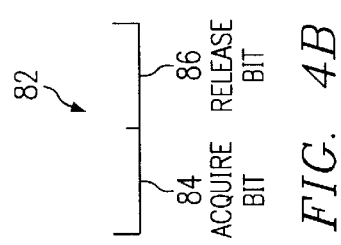
FIGS. 4A and 4B illustrate protection bits that are used to protect shared memory pages in the multipage processor computer.

Referring to FIG. 4A, a local access protection bit is generally indicated at 80. Local access protection bit 80 is part of memory directory 26 in memory page 16. Local access protection bit 80 determines whether a particular memory page 16 is accessible by processors 12 within the current cell. Local access protection bit 80 is used to minimize the memory protection overhead for reads to a particular memory page 16 from processors 12 within the current cell.

Figure 4B:
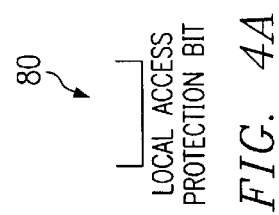

Referring to FIG. 4B, shared memory protection bits are generally indicated at 82. Shared memory protection bits 82 includes an acquire protection bit 84 and a release protection bit 86. Each memory page 16 has shared memory protection bits 82 for each processor 12 or processor region covered by current cell register 70. Therefore, two shared memory protection bits 82 exist in each memory page 16 for each bit in the current cell register 70 in memory controller 15. The shared memory protection bits 82 for each processor 12 or processor region in current cell register 70 are stored in memory page 16 in memory page directory 26.

Shared memory protection bits 82 separately protect a shared memory page 16 from acquire operations and release operations. Acquire operations include any operation that acquires ownership of a cache line including read operations and write invalidate operations. Release operations include any operation that causes a processor 12 to no longer own a cache line 20 such as write backs and transfer messages. A write back writes the contents of cache 18 to the memory page 16 before releasing the cache line, and transfer messages release ownership of the cache line for use by other processors 12 without writing the contents of the cache line to memory page 16.

If acquire protection bit 84 is enabled, the corresponding processor 12 may perform any memory access operation that acquires ownership of a cache line 20 coupled to a memory page 16. These memory access operations generally read memory data 24 and memory directory 26 at the same time since no changes are being made to memory data 24. After reading memory directory 26, memory protection and access information is verified before returning memory data 24 to the requesting processor 12.

If release protection bit 86 is enabled, the corresponding processor 12 may perform memory access operations that release ownership of a cache line 20. In conventional systems, these types of operations read memory directory 26, verify memory protection and access information, and then write new data to memory data 24. In those conventional systems, the write latency may be approximately 16 clock cycles which is equivalent to 80 nanoseconds if the clock cycles at 200 MHz. Before a write to memory data 24 is processed, memory protection and access verification is performed since the write to memory data 24 is destructive and changes the contents of memory data 24. Updates to a memory page 16 from processors 12 within the current cell, as defined by current cell register 70, bypass the memory protection and access verification process since a read operation is performed before a write operation thereby verifying the memory protection and access verification information for the memory page 16. By separating the protection bits into the acquire protection bit 84 and the release protection bit 86, multiprocessor computer 10 can remove a cell 14 from the shared area of multiprocessor computer 10 or deactivate a particular cell 14 without affecting operation of the other cells 14. The specific operational use of current cell register 70, local access protection bit 80, and shared memory protection bits 82 will be discussed in detail with reference to FIGS. 5 and 6.

Figure 5A:
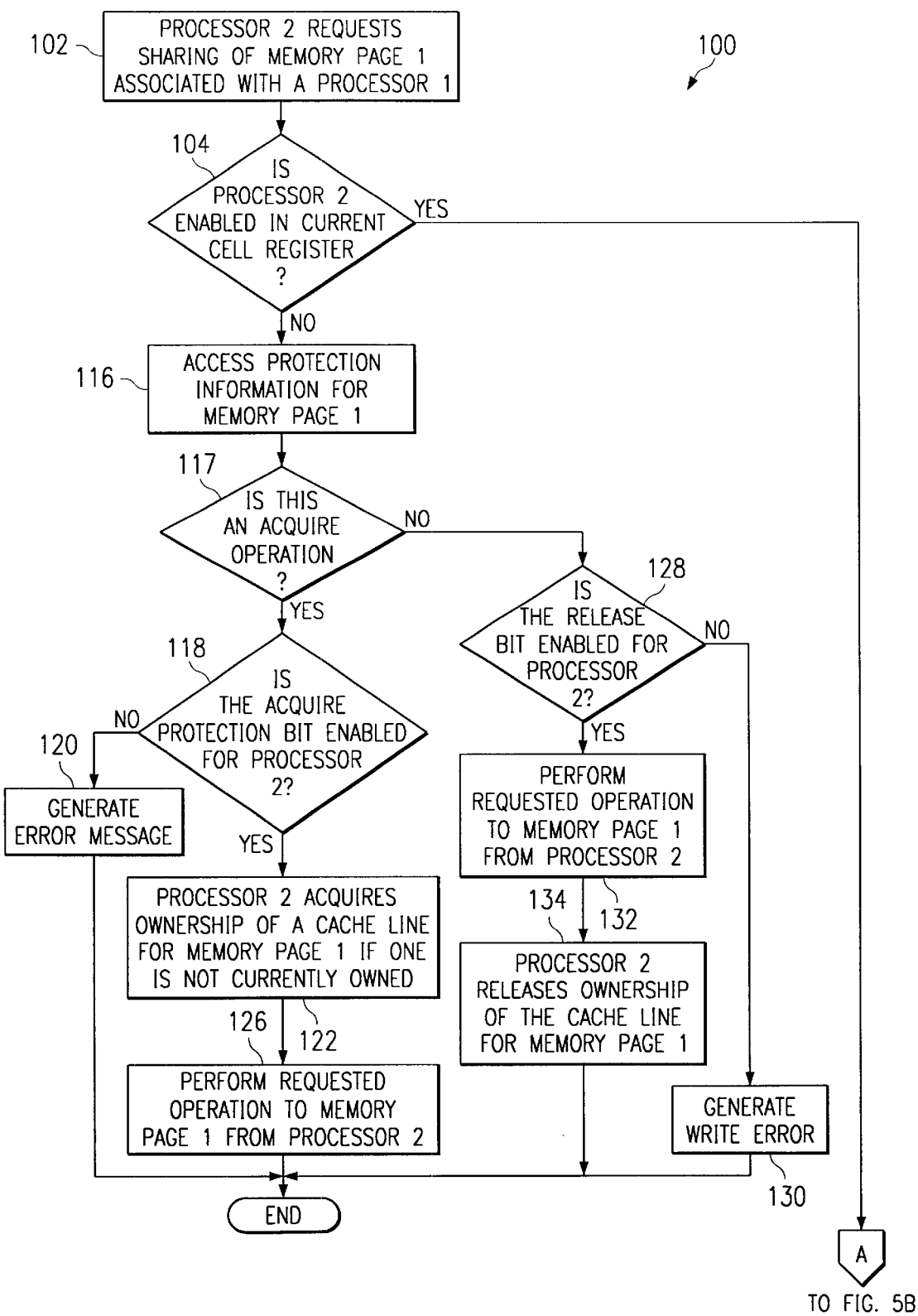
FIG. 5 is a flow diagram illustrating read/write sharing of memory pages.
Figure 5B:
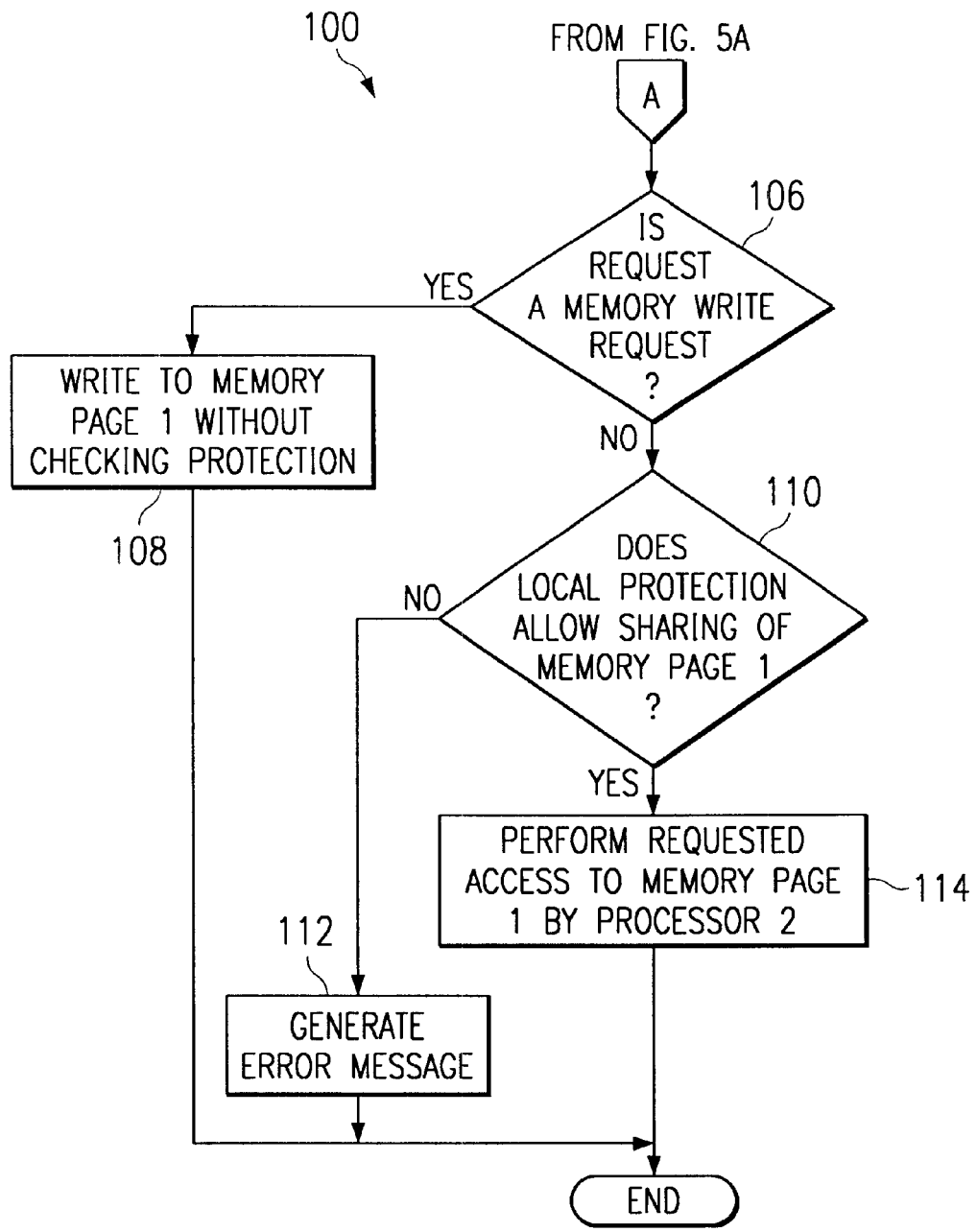

Referring to FIG. 5, a method for read/write sharing of memory pages is generally indicated at 100. This method covers memory protection for normal shared memory processing in multiprocessor computer 10. The method commences at step 102, where second processor 42 requests access to and sharing of first cell memory page 50 which is associated with a memory controller 15. Shared memory processing is a basic element of multiprocessor computers.

The method proceeds to decisional step 104 where a decision is made regarding whether second processor 42 is part of the current cell as defined by current cell register 70 in memory controller 15 to which first cell memory page 50 is associated. In other words, a determination is made regarding whether the second processor 42 and first processor 40 are in the same cell 14. If second processor 42 and first processor 40 are within the same cell 14 as indicated by the current cell register 70, the YES branch of decisional step 104 proceeds to decisional step 106 where a determination is made regarding whether the current memory access request by second processor 42 is a write request.

If the memory access request is a write request, the YES branch of decisional step 106 proceeds to step 108. If the method proceeds to step 108, second processor 42 and first processor 40 are in the same cell 14 and second processor 42 has requested to write to first cell memory page 50 which is associated with a memory controller 15. At step 108, second processor 42 writes to first memory page 50 immediately without verifying memory protection information. As part of a write operation, a read operation was previously performed where local access protection bit 80 was checked for authorized access by second processor 42. If second processor 42 was not authorized on the read operation, an error would have occurred and the write operation would not have issued. Therefore, since the write operation is being processed, access authorization is assumed to have occurred on the previous read operation. By writing to first cell memory page 50 without verifying memory protection and access information, any write latency period may be avoided thereby enhancing the performance of multiprocessor computer 10. In conventional systems, the write latency period may be approximately 16 clock cycles which is approximately 80 nanoseconds if the clock cycles at 200 MHz. The method of steps 104, 106, and 108 may be placed in a memory page update module. The memory page update module would immediately update a memory page 16 with information from a cache 18 coupled to one of the cache lines 20 of the memory page 16 in response to the processor 12 coupled to the cache line 20 being within the current cell 14 as defined by the current cell register 70. After step 108, the method terminates.

If the memory access request is not a write request, the NO branch of decisional step 106 proceeds to decisional step 110 where a determination is made regarding whether the local access protection bit 80 stored in first cell memory page 50 allows sharing of first cell memory page 50. If the method proceeds to this point, the requesting processor 12 is within the same cell 14 as the requested memory page 16 and the memory access request is a read oriented request. If the local access protection bit 80 indicates that memory sharing is not allowed for first cell memory page 50, the NO branch of decisional step 110 proceeds to step 112 where a read error message is generated. The method of steps 110 and 112 may be placed in a local access authorization module. The local access authorization module would deny shared memory access to a particular memory page 12 in the current cell 14 by a processor 12 in the current cell 14 in response to the local access protection bit 80 indicating that the particular memory page 16 may not be shared by processors 12 in the current cell 14. The method terminates after step 112.

If the local access protection bit 80 indicates that memory sharing is allowed for first cell memory page 50, the YES branch of decisional step 110 proceeds to step 114 where the requested memory access from second processor 42 to first cell memory page 50 is performed. The act of performing the requested access includes acquiring ownership of a cache line 20 by second processor 42 thereby establishing a cache line connection 22. The path for communications between second processor 42 and first cell memory page 50 passes from second processor 42 to its associated cache 18 through a cache line connection 22 to a cache line 20 coupled to first cell memory page 50. The method of steps 110 and 114 may be placed in the local access authorization module. In that case, the local access authorization module would allow shared memory access to a particular memory page 16 in the current cell 14 by a processor 12 in the current cell 14 in response to the local access protection bit 80 indicating that the particular memory page 16 may be shared by processors 12 in the current cell 14. After step 114, the method terminates.

If second processor 42 is not within the same cell as first processor 40 as indicated by current cell register 70 stored in first cell memory page 50, the NO branch of decisional step 104 proceeds to step 116 where protection information related to second processor 42 is accessed in first cell memory page 50. Each processor 12 or processor region represented in current cell register 70 has an associated set of shared memory protection bits 82 stored in each memory page 16. These shared memory protection bits 82 indicate whether the requesting processor 12 from outside the current cell 14 has access rights to the current memory page 16.

The method proceeds to decisional step 117 where a determination is made regarding whether the current access operation is an acquire operation. If the current access operation is an acquire operation, the YES branch of decisional step 117 proceeds to decisional step 118 where a determination is made regarding whether the acquire protection bit 84 is enabled for second processor 42. If the acquire protection bit 84 is not enabled for second processor 42, the NO branch of decisional step 118 proceeds to step 120 where an error message is generated indicating that second processor 42 cannot acquire ownership of a cache line 20 for first cell memory page 50. After step 120, the method terminates.

If the acquire protection bit 84 is enabled for second processor 42, the YES branch of decisional step 118 proceeds to step 122 where second processor 42 acquires ownership of a cache line 20 for first cell memory page 50 if a cache line 20 for first cell memory page 50 is not currently owned by second processor 42.

The method proceeds to step 126 where the requested acquire operation is performed against first cell memory page 50 for second processor 42. No further memory protection checking is required since second processor 42 is not changing the contents of memory data 24 in first cell memory page 50. After step 126, the method terminates.

Returning to decisional step 117, if the current access operation is not an acquire operation, the NO branch of decisional step 117 proceeds to decisional step 128 where a decision is made regarding whether the release protection bit 86 is enabled for second processor 42. If the method proceeds to decisional step 128, the access operation is a release operation. If the release protection bit 86 is not enabled for second processor 42, the NO branch of decisional step 128 proceeds to step 130 where a write error message is generated indicating that second processor 42 does not have write authorization for first cell memory page 50. After step 130, the method terminates.

If the release protection bit 86 is enabled for second processor 42, the YES branch of decisional step 128 proceeds to step 132 where the write request to first cell memory page 50 from second processor 42 is performed. The write from second processor 42 changes the contents of memory data 24 in first cell memory page 50. The method leading to step 132 may be placed in a memory page update module. The memory page. update module would authorize updating of the memory page 16 in response to the processor 12 coupled to the cache line 20 not being within the current cell 14 as defined by the current cell register 70. After step 132, the method terminates.

Referring to FIG. 6, a method for removing a cell 14 in multiprocessor computer 10 from a shared resources list is generally indicated at 200. The method for removing a cell 14 may be used for a variety of purposes including deactivating a cell for repair or maintenance, removing the cell 14 from the list of resources that can share a particular memory page 16, or any other situation where a particular memory page 16 is no longer accessible by a cell 14 or processor 12. The method commences at step 202 where second processor 42, in a cell 14, acquires ownership of a cache line 20 from first cell memory page 50 in another cell 14. Second processor 42 uses first cell memory page 50 and temporarily stores updates for first cell memory page 50 in cache 18 associated with second processor 42. Step 202 essentially states that second processor 42 has gone through the method for memory page sharing 100 illustrated in FIG. 5. At this point, first cell memory page 50 may not be completely updated and updated data for first cell memory page 50 may exist in cache 18 associated with second processor 42. In addition, second processor 42 and first cell memory page 50 exist in different cells 14, and second processor 42 has not released ownership of a cache line 20 coupled to first cell memory page 50.

The method proceeds to step 204 where the cell 14 containing first cell memory page 50 receives notification that the cell 14 containing second processor 42 and its associated cache 18 is being removed from the shared resources list. Cell 14 may be removed to reboot an operating system, to perform routine maintenance on that section of multiprocessor computer 10, to replace boards in that section of multiprocessor computer 10, or for any other reason where memory pages 16 within a cell 14 are no longer available for shared access within the entire multiprocessor computer 10.

The method proceeds to step 206 where cells 14 other than the cell 14 being removed from the shared resources list disable the acquire protection bit 84, associated with each processor 12 in the cell 14 being removed from the shared resources list, in each memory page 16 contained in cells 14 other than the cell 14 being removed from the shared resources list. Each memory page 16 outside of the cell 14 being removed, has the acquire protection bit 84 disabled for the processors 12 associated with the cell 14 being removed. This prevents processors 12 within the cell 14 being removed from acquiring ownership of cache lines 20 coupled to memory pages 16 of processors outside of the cell 14 being removed. This essentially prevents any additional shared memory page use by processors 12 within the cell 14 being removed.

The method proceeds to step 208 where the cells 14 other than the cell 14 being removed read each cache line 20 for each memory page 16 within the cells 14 other than the cell 14 being removed. The process of reading each cache line pulls data from caches 18 coupled to cache lines 20 such that memory page 16 is completely updated. Since the release protection bits 86 have not yet been disabled, processors 12 within the cell 14 being removed may write updated data from their associated cache 18 to memory pages 16 outside of the cell 14 being removed. This insures that memory page 16 contains the most current data available. At this point the release protection bit 86 is still enabled allowing memory page 16 to be updated by the processor 12 corresponding to the enabled release protection bit 86.

The method proceeds to step 210 where cells 14, other than the cell 14 being removed, disable the release protection bit 86 for each processor 12 associated with the cell 14 being removed in each memory page 16 contained within the remaining shared cells 14. By disabling release protection bit 86, processors 12 within the cell 14 being removed can no longer update and alter data in memory pages 16 existing outside of the cell 14 being removed.

The method proceeds to decisional step 211 where a determination is made regarding whether the cell being removed is also being deactivated. If the cell being removed is not being deactivated, the NO branch of decisional step 211 terminates the method. If the cell 14 being removed is also being deactivated, the YES branch of decisional step 211 proceeds to step 212 where the cell 14 being deactivated is now isolated and can be deactivated through the normal deactivation process. This process allows for orderly deactivation of the cell without affecting the operation of other cells 14 within multiprocessor computer 10. This process also ensures that memory pages 16 are current prior to disabling memory sharing for processors 12 within the cell 14 being deactivated. After step 212, the method terminates.

Thus, it is apparent that there has been provided, in accordance with the present invention, a system and method for shared memory protection in a multiprocessor computer that satisfies the advantages set forth above including enhanced shared memory protection. Although the present invention and its advantages have been described in detail, it should be understood that various changes, substitutions, and alterations may be readily apparent to those skilled in the art and may be made herein without departing from the spirit and the scope of the present invention as defined by the following claims.

What is claimed is:

1. A memory protection system for shared memory in a multiprocessor computer, comprising:
    a multiprocessor computer having a plurality of processor regions and a plurality of memory pages, each processor region including one or more processors, each processor including a cache, a memory page including one or more cache lines for association with the cache within the plurality of processor regions using the memory page;
    wherein the memory page includes a set of protection bits associated with each processor region in the plurality of processor regions;
    wherein the set of protection bits includes an acquire protection bit for each processor region in the plurality of processor regions, each acquire protection bit determining whether the associated processor region is enabled to perform acquire operations on the memory page;
    wherein the set of protection bits includes a release protection bit for each processor region in the plurality of processor regions, each release protection bit determining whether the associated processor region is enabled to perform release operations on the memory page.

2. The system of claim 1, wherein the multiprocessor computer is divided into one or more cells, each of the one or more cells including one or more of the plurality of processor regions and one or more of the plurality of memory pages.

3. The system of claim 2, further comprising:
    a memory controller operable to indicate which processor regions in the plurality of processor regions are part of a current cell.

4. The system of claim 3, wherein the memory controller is operable to immediately update the memory page with information from a cache associated with one of the one or more cache lines of the memory page in response to the processor associated with the one of the one or more cache lines being within the current cell as determined by the memory controller.

5. The system of claim 4, wherein the memory controller is further operable to authorize updating of the memory page in response to the processor associated with the one of the one or more cache lines not being within the current cell as determined by the memory controller.

6. The system of claim 5, wherein the memory controller is operable to authorize updating of the memory page by checking the appropriate set of protection bits in the memory page.

7. The system of claim 1, wherein the acquire operations performed by the processors include any processor operation that acquires ownership of a memory page cache line.

8. The system of claim 1, wherein the release operations performed by the processors include any processor operation that releases ownership of the memory page cache line after first acquiring ownership of the memory page cache line.

9. The system of claim 3, wherein the memory controller is operable to allow shared memory access to a particular memory page in the current cell by a processor in the current cell in response to a local access protection bit indicating that the particular memory page may be shared by processors in the current cell.

10. The system of claim 3, wherein the memory controller is operable to deny shared memory access to a particular memory page in the current cell by a processor in the current cell in response to a local access protection bit indicating that the particular memory page may not be shared by processors in the current cell.

11. A memory protection system for memory shared between multiple processors, comprising:
    a memory page capable of shared use by a local processor and a plurality of remote processors;
    wherein the memory page includes an acquire protection bit associated with each remote processor for enabling acquire operations from the remote processor;
    wherein the memory page includes a release protection bit associated with each remote processor for enabling release operations from the remote processor;
    a memory controller operable to indicate which remote processors in the plurality of remote processors are part of a current cell.

12. The system of claim 11, wherein the memory controller is operable to immediately update the memory page with information from a cache associated with one of one or more cache lines of the memory page in response to the remote processor associated with the one of the one or more cache lines being within the current cell as determined by the memory controller, the memory controller operable to authorize updating of the memory page in response to the remote processor associated with the one of the one or more cache lines not being within the current cell as determined by the memory controller;
    wherein the memory controller is operable to authorize updating of the memory page by checking the acquire protection bit and the release protection bit associated with the remote processor associated with the one of the one or more cache lines.

13. The system of claim 11, wherein the memory controller is operable to allow shared memory access to the memory page by a remote processor in the current cell in response to a local access protection bit indicating that the memory page may be shared with remote processors, the memory controller operable to deny shared memory access to the memory page by a remote processor in the current cell in response to the local access protection bit indicating that the memory page may not be shared with remote processors.

14. A method for protecting shared memory in a multiprocessor computer, comprising:
    receiving a notification in a first cell of processors indicating that a second cell of processors is being removed from a shared resources list, the first cell of processors including a first processor and a plurality of memory pages, the second cell of processors including a second processor and a plurality of memory pages;
    disabling an acquire protection bit for each processor in the second cell of processors in each memory page in the first cell of processors;
    reading cache lines for each memory page in the first cell of processors;
    disabling a release protection bit for each processor in the second cell of processors in each memory page in the first cell of processors.

15. The method of claim 14, further comprising:
    removing the second cell of processors from the shared resources list after disabling all release protection bits for each processor in the second cell of processors in each memory page in the first cell of processors.

16. The method of claim 14, further comprising:
    requesting read access to a memory page in a cell of processors by the second processor, wherein the second processor is associated with a cell of processors;

determining that the second processor is in a cell of processors with the memory page;

verifying that a local protection bit for the memory page allows sharing of the memory page in response to the second processor being in a cell of processors with the memory page;

performing a read operation to the memory page by the second processor in response to the local protection bit indicating that the memory page may be shared;

requesting write access to the memory page by the second processor;

writing to the memory page without verifying protection information for the memory page in response to the second processor being in a cell of processors with the memory page.

17. The method of claim 14, further comprising:

requesting read access to a memory page in a cell of processors by the second processor, wherein the second processor is associated with a cell of processors;

determining that the second processor is not in a cell of processors with the memory page;

verifying that an acquire protection bit for the second processor is enabled in the memory page, the acquire protection bit allowing access by the second processor to a cache line of the memory page in response to the second processor not being in a cell of processors with the memory page;

acquiring a cache line to the memory page by the second processor in response to the acquire protection bit being enabled;

performing a read operation to the memory page by the second processor in response to the acquire protection bit indicating that the second processor has acquire access to the memory page;

requesting write access to the memory page by the second processor;

verifying that a release protection bit for the second processor is enabled in the memory page, the release protection bit allowing update access by the second processor to a cache line of the memory page in response to the second processor not being in a cell of processors with the memory page and requesting to write to the memory page;

writing to the memory page in response to the release protection bit for the second processor being enabled.

* * * * *